(12) United States Patent
Wang et al.

(10) Patent No.: US 12,540,920 B2
(45) Date of Patent: Feb. 3, 2026

(54) SHEATH CHANNEL FORMATION BETWEEN CAPILLARIES FOR HIGH THROUGHPUT CAPILLARY ELECTROPHORESIS

(71) Applicant: ProteinSimple, San Jose, CA (US)

(72) Inventors: Roland Y. Wang, Dublin, CA (US); Philip H. Chao, San Jose, CA (US); Allen R. Boronkay, San Jose, CA (US); David J. Roach, Los Gatos, CA (US); Hui Xu, Dublin, CA (US); Joshua I. Molho, Oakland, CA (US); Tom Weisan Yang, Cupertino, CA (US)

(73) Assignee: ProteinSimple, San Jose, CA (US)

( * ) Notice: Subject to any disclaimer, the term of this patent is extended or adjusted under 35 U.S.C. 154(b) by 207 days.

(21) Appl. No.: 18/241,684

(22) Filed: Sep. 1, 2023

(65) Prior Publication Data
US 2024/0210352 A1 Jun. 27, 2024

Related U.S. Application Data

(63) Continuation of application No. PCT/US2022/018988, filed on Mar. 4, 2022.

(60) Provisional application No. 63/156,655, filed on Mar. 4, 2021.

(51) Int. Cl.
*G01N 27/447* (2006.01)

(52) U.S. Cl.
CPC ... *G01N 27/44743* (2013.01); *G01N 27/4473* (2013.01)

(58) Field of Classification Search
CPC ......... G01N 27/44704; G01N 27/4473; G01N 27/44743; G01N 27/44747
See application file for complete search history.

(56) References Cited

U.S. PATENT DOCUMENTS

| 5,372,695 A | * | 12/1994 | Demorest | ........ G01N 27/44704 204/603 |
| 7,169,277 B2 | * | 1/2007 | Ausserer | .......... G01N 27/44743 204/453 |
| 2017/0363575 A1 | * | 12/2017 | Huang | ............. G01N 27/44795 |
| 2020/0126779 A1 | * | 4/2020 | Arnold | ............... G01N 30/7266 |

* cited by examiner

*Primary Examiner* — C. Sun
(74) *Attorney, Agent, or Firm* — Casimir Jones, S.C.; Brian F. Bradley

(57) ABSTRACT

Some embodiments described herein relate to capillary-containing cartridges suitable for use with capillary electrophoresis instruments. Embodiments described herein generally relate to cartridges that include a transfer capillary coupled to a separation capillary. The transfer capillary can be configured to be disposed in sample reservoirs and/or buffer reservoirs. Suction applied through a sheath interface of the transfer capillary and the separation capillary can draw sample/buffer from such reservoirs and bring the sample/buffer into contact with the separation capillary. The separation capillary can be configured for separation of analytes contained within the sample, for example when an electric potential (i.e., voltage) is applied across the separation capillary.

18 Claims, 7 Drawing Sheets

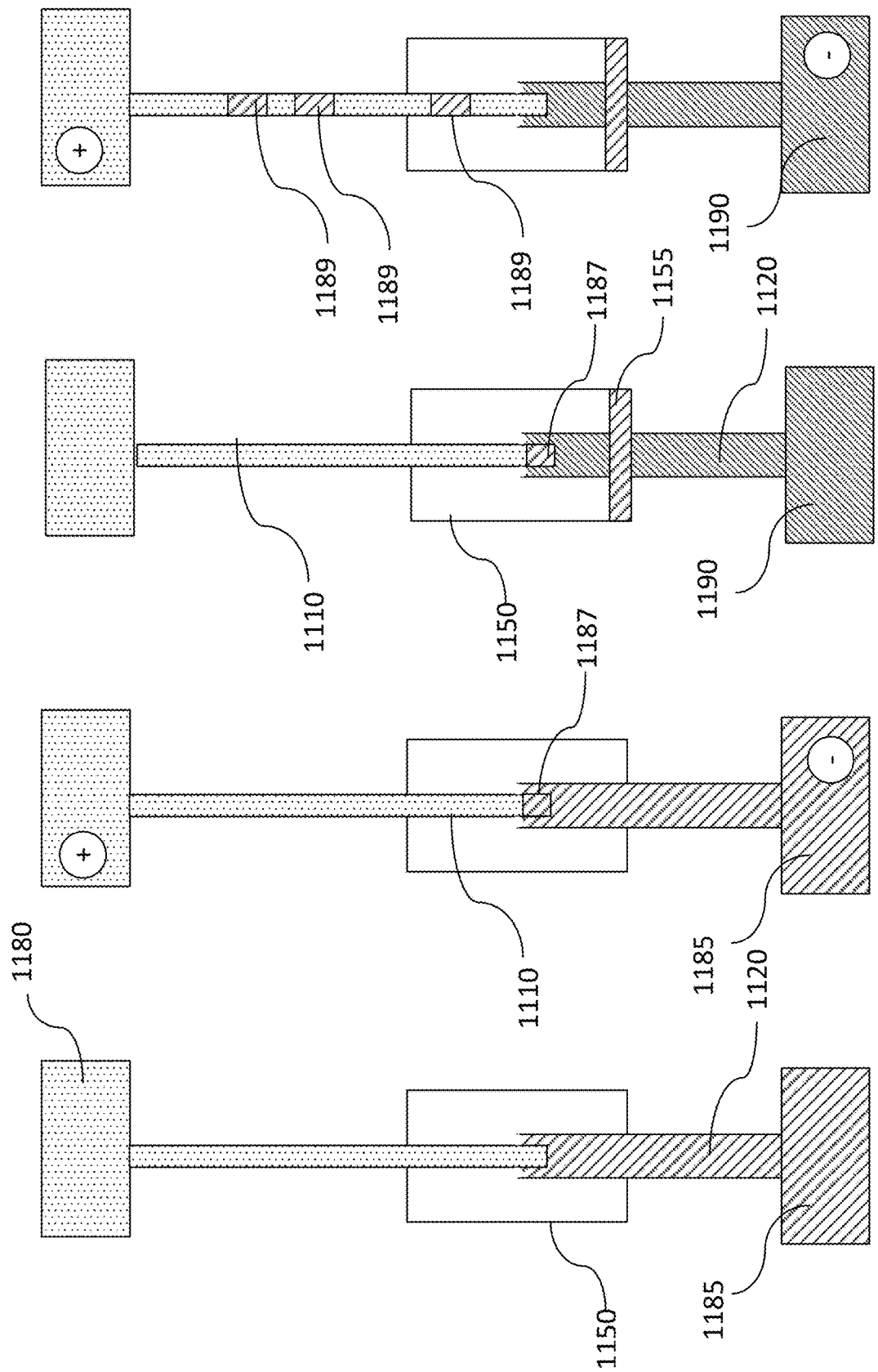

SHEATH CHANNEL FORMATION BETWEEN CAPILLARIES FOR HIGH THROUGHPUT CAPILLARY ELECTROPHORESIS

CROSS REFERENCE TO RELATED APPLICATION

This application is a continuation of International Application No. PCT/US22/018988, filed Mar. 4, 2022, which claims priority to and benefit of U.S. Provisional Patent Application No. 63/156,655, filed Mar. 4, 2021, the entire disclosure of each which is hereby incorporated by reference

FIELD

Embodiments described herein generally relate to capillary electrophoresis. According to some embodiments, a secondary, or transfer, capillary provides reagents to a primary, or separation, capillary. This can allow the separation capillary to be shorter than is otherwise possible, increasing sample throughput.

BACKGROUND

Throughput of capillary electrophoresis is a function of the length of the separation capillary. The shorter the capillary, the less time is needed for samples to migrate past the detector for a given electric field. Thus, for shorter capillaries, more samples can be analyzed for a given amount of time. In many cases, however, compatibility with a pre-existing instrumentation system requires a fixed capillary length. Given this geometrical constraint, a short capillary may have difficulty accessing the sample or other necessary reagents. Accordingly, a need exists to improve the throughput of capillary electrophoresis, in particular in instruments designed for fixed-length separation capillaries.

BRIEF DESCRIPTION OF THE DRAWINGS

FIGS. 3A-3D illustrate a method of using a capillary cartridge including a sheath channel, according to an embodiment.

SUMMARY

Figure 1A:
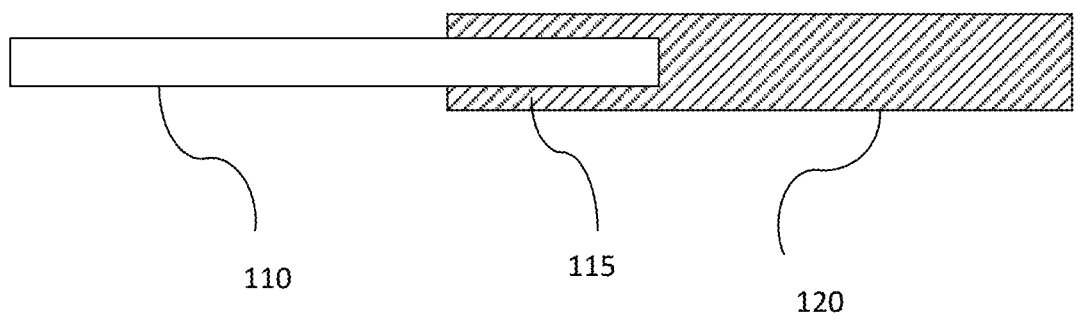
FIG. 1A is a schematic representation of a first capillary and a second capillary forming a T-junction, according to an embodiment.

Some embodiments described herein relate to apparatuses and methods for separation of samples containing biological materials or analytes, such as proteins.

Some embodiments described herein relate to capillary-containing cartridges suitable for use with capillary electrophoresis instruments, such as Maurice by ProteinSimple®. U.S. Pat. No. 10,794,860, issued on Oct. 6, 2020 and entitled "Systems and Method for Capillary Electrophoresis, Isoelectric Point, and Molecular Weigh Analysis," the entire disclosure of which is hereby incorporated by reference, includes additional disclosure of a suitable capillary electrophoresis instrument and cartridges suitable for capillary electrophoresis. Known cartridges used in electrophoresis instruments typically contain a capillary of a constant diameter that is used both to load sample and/or running buffer from reservoirs and separate analytes contained in the sample. Embodiments described herein generally relate to cartridges that include a transfer capillary coupled to a separation capillary. The transfer capillary can be configured to be disposed in sample reservoirs and/or buffer reservoirs. Suction applied through a sheath interface of the transfer capillary and the separation capillary can draw sample/buffer from such reservoirs and bring the sample/buffer into contact with the separation capillary. The separation capillary can be configured for separation of analytes contained within the sample, for example when an electric potential (i.e., voltage) is applied across the separation capillary. The electric potential can be applied across the lumen of the separation capillary via a top running buffer reservoir and a bottom running buffer reservoir. The top running buffer reservoir can be disposed in the cartridge, and a top of the separation capillary can be disposed in the top running buffer reservoir. A bottom of the transfer capillary can be disposed in a bottom running buffer reservoir, which can be disposed in a sample plate that is a portion of or accessed by the capillary electrophoresis instrument. Similarly stated, the transfer capillary can extend from the cartridge and be "dipped" into a bottom running buffer reservoir.

The capillaries of known cartridges configured for electrophoretic separation are typically subject to minimum length constraints such that when the top of the separation capillary is disposed within the top running buffer reservoir the bottom of the separation capillary can reach a sample tray and/or bottom running buffer reservoir. Embodiments described herein generally relate to cartridges that have separation capillaries shorter than the minimum length typically required by capillary electrophoresis instruments, which can increase sample throughput. A transfer capillary can be fluidically coupled to a separation capillary, such that the combined length of the separation capillary, transfer capillary, and optionally additional intermediate capillaries satisfy the minimum length requirements of known instruments.

DETAILED DESCRIPTION

Figure 1B:
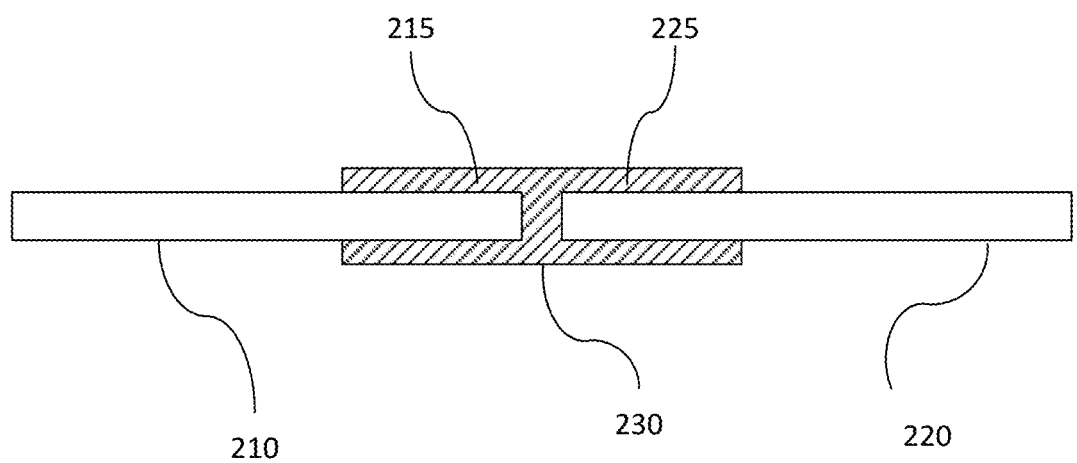
FIG. 1B is a schematic representation of three capillaries forming a cross junction, according to an embodiment.

Embodiments described herein generally relate to cartridges containing capillaries that form a junction. Junctions allow fluidic channels to interact with each other to form networks of fluidic paths to perform various functions. Junctions can be constructed in the form of T-junctions, cross-junctions, or other complex intersections. In contrast to microfluidic chips, where it is relatively straightforward to design and construct junctions, it is nontrivial to form such intersections in capillaries, especially if the junctions require sharp transitions and low dead volumes. Some embodiments described herein involve the insertion of a small capillary into a large capillary to create a sheath channel which acts as a third channel, thus forming a T-junction (e.g., as shown in FIG. 1A). Other embodiments described herein involve the insertion of two small capillaries into a large capillary, thus forming a cross-junction with the two sheath channels acting as third and fourth channels (e.g., as shown in FIG. 1B). For the T-junctions and cross-junctions created in this way, the transitions are sharp (if the capillary ends are sharp from the cleaving process) and the dead volumes are minimal.

Some embodiments described herein relate to a cartridge that includes a first capillary configured for analyte separation during capillary electrophoresis, a second capillary configured to introduce reagents and analytes into the first capillary, and a third capillary disposed between the first capillary and a second capillary. An inner diameter of the third capillary can be larger than an outer diameter of the first capillary and an outer diameter of the second capillary.

Some embodiments described herein relate to a cartridge that includes a first capillary configured for analyte separation during capillary electrophoresis and a second capillary configured to introduce reagents and analytes into the first capillary. The second capillary can have an inner diameter larger than an outer diameter of the first capillary.

Some embodiments described herein relate to a method that includes applying vacuum to a second capillary via at least one of a junction of of the second capillary and a third capillary or a junction of a first capillary and the third capillary while a first end of the second capillary is disposed in a sample reservoir, such that sample is drawn from the sample reservoir into the second capillary. The first capillary configured for analyte separation during electrophoresis. A first end portion of the first capillary can be inserted into a second end portion of the third capillary and a second end portion of the second capillary can be inserted into a first end portion of the third capillary such that the first end portion of the first capillary is in contact with sample when the second capillary and the third capillary are filled with sample. After drawing the sample from the sample reservoir, the second end of the second capillary can be disposed into a run buffer reservoir. A vacuum can be applied to at least one of the junction of the second capillary and a third capillary or the junction of a first capillary and the third capillary while the first end of the second capillary is disposed in the run buffer reservoir such that run buffer is drawn from the run buffer reservoir into the second capillary and the third capillary. The sample can be electrophoretically separated in the first capillary, for example, after the run buffer is drawn into the second capillary and the third capillary.

Some embodiments described herein relate to a method that includes applying vacuum to a junction of a first capillary and a second capillary while a first end of the second capillary is disposed in a sample reservoir such that sample is drawn from the sample reservoir into the second capillary. The first capillary can be configured for analyte separation during electrophoresis. A first end portion of the first capillary can be inserted into a second end portion of the second capillary such that the first end portion of the first capillary is in contact with sample when the second capillary is filled with sample. Vacuum can be applied to a junction of the first capillary and the second capillary while a first end of the second capillary is disposed in a sample reservoir such that sample is drawn from the sample reservoir into the second capillary. The second end of the second capillary can be disposed into a run buffer reservoir after the sample is drawn from the sample reservoir. A vacuum can be applied to the junction of the first capillary and the second capillary while the first end of the second capillary is disposed in the run buffer reservoir such that run buffer is drawn from the run buffer reservoir into the second capillary. The sample can be electrophoretically separated in the first capillary, for example, after the run buffer is drawn into the second capillary and the third capillary.

FIG. 1A is a schematic illustration of a first (primary and/or separation) capillary 110 and a second (secondary and/or transfer) capillary 120 forming a T-junction, according to an embodiment. As described in further detail herein, the secondary capillary 120 can be configured to transfer reagents to a primary separation capillary 110. The secondary capillary 120 can have an internal diameter (ID) larger than the outer diameter (OD) of the primary capillary 110 or vice versa. The primary capillary 110 (defining a first channel or lumen) can be inserted into the secondary capillary 120 (defining a second channel or lumen) or vice versa, and the space between the OD of the primary capillary 110 and the ID of the secondary capillary 120 forms a sheath channel 115 through which liquid can be drawn. This construction essentially creates a T-junction between the primary and secondary capillaries—the sheath channel 115 acts as a third capillary. For example, as discussed in further detail herein, a vacuum can be applied to sheath channel 115, which can allow sample and/or buffer to be aspirated through the secondary capillary 120, be brought into contact with an opening of the primary capillary 110, with excess liquid expelled through the sheath channel 115. A cartridge incorporating such a capillary assembly can be used to perform capillary electrophoresis, such as a sodium dodecyl sulfate (CE-SDS) assay with a greatly improved throughput relative to an assay using a single separation capillary having an overall length equal to or similar to (i.e., within 80% of) the combined length of the primary capillary 110 and secondary capillary 120 (less the overlapping region), as shown in FIG. 1A.

FIG. 1B is a schematic illustration of a first (primary and/or separation) capillary 210, a second (intermediate) capillary 230, and a third (transfer) capillary 220 forming a cross junction, according to an embodiment. As described in further detail herein, the transfer capillary 220 can be configured to transfer reagents to a primary separation capillary 210 via the intermediate capillary 230. The intermediate capillary 230 can have an internal diameter (ID) larger than the outer diameter (OD) of both the primary capillary 210 and the transfer capillary 220 or vice versa. The primary capillary 210 (defining a primary channel or lumen) and the transfer capillary 230 (defining a second channel or lumen) can be inserted into the intermediate capillary 220 (or vice versa). The space between the OD of the primary capillary 210, the OD of the transfer capillary 220, and the ID of the intermediate capillary 220 forms sheath channels 215, 225 through which liquid can be drawn. This construction essentially creates a cross-junction between the primary and transfer capillaries. For example, as discussed in further detail herein, a vacuum can be applied to channels 215 and/or 225, which can allow sample and/or buffer to be aspirated through the primary capillary 210 and/or the transfer capillary 220, be brought into contact with an opening of the other of the primary capillary 210 and/or transfer capillary 220, with excess liquid expelled through channel 215 and/or 225. The relative flow rate through the primary capillary 210 and/or the transfer capillary 220 can be controlled by selecting the diameter and/or length of the primary and transfer capillaries and/or the viscosity of fluids. A cartridge incorporating such a capillary assembly can be used to perform capillary electrophoresis, such as a sodium dodecyl sulfate (CE-SDS) assay, with a greatly improved throughput relative to an assay using a single separation capillary having an overall length equal or similar to (i.e., within 80% of) the combined length of the primary capillary 210, secondary capillary 230, and transfer capillary 220) (less the overlapping region), shown in FIG. 1B.

The primary capillary 210 and the transfer capillary 220 can have the same or different IDs and/or ODs. In the embodiment shown in FIG. 1B, the ODs of each of the primary capillary 210 and the transfer capillary 220 are smaller than the ID of the intermediate capillary 230, but may have differently sized IDs and/or ODs. Sheath channels 215 and 225, therefore, can have different widths depending upon the difference between the ODs of the primary capillary 210 and the transfer capillary 220 and the ID of the intermediate capillary 230. In an alternative embodiment in which the intermediate capillary is inserted into the primary capillary and transfer capillary, the IDs of the primary capillary and the transfer capillary are larger than the OD of the intermediate capillary.

The capillary assemblies shown in FIGS. 1A and/or 1B can be integrated into a cartridge configured for use in a capillary electrophoresis instrument, such as Maurice by ProteinSimple®. A capillary with a short length and small outer diameter serves as the electrophoresis channel and is inserted into a capillary with a long length and large internal diameter which is used as a reagent transfer channel and/or intermediate channel. The overlap region between the capillaries is the sheath channel(s) which ranges from 0.5 to 100 mm in length. 1 to 30 mm in length. 3-25 mm in length, or in some preferred constructions 5-15 mm in length. The sheath channel(s) can have a width (i.e., the distance between the outer wall of the inner capillary and the inner wall of the outer capillary or half the difference of the OD of the inner capillary and the ID of the outer capillary) between 5 and 60 µm: in some preferred constructions the sheaths channel(s) have a width between 14.5 and 22.5 µm. A waste tank encloses the outlet of the sheath channel and any liquid that comes out of the sheath channel will flow into the waste tank. The waste tank can have any suitable volume, such as 1, 3, 5, 10, 15, 20, or 30 mL. The liquid at the outlet of the sheath channel forms a meniscus which generates capillary force to prevent liquid from flowing back down the transfer capillary (e.g., resists gravimetric flow within the large capillary) when the vacuum/pressure stops.

In some embodiments, the portion of the primary capillary 110, 210 that inserted into the secondar capillary 120 (as shown in FIG. 1A) or the intermediate capillary 230 (as shown in FIG. 1B) can be polished (e.g., are polished) prior to assembly. Similarly, in the embodiment of FIG. 1A, the end of the secondary capillary 120 opposite sheath junction 115 can be polished. In the embodiment of FIG. 1B, both ends of the secondary capillary 220 can be polished. Polishing the ends of capillaries exposed to liquid can reduce nucleation sites, which can reduce sheath channel blockages.

Figure 2A:
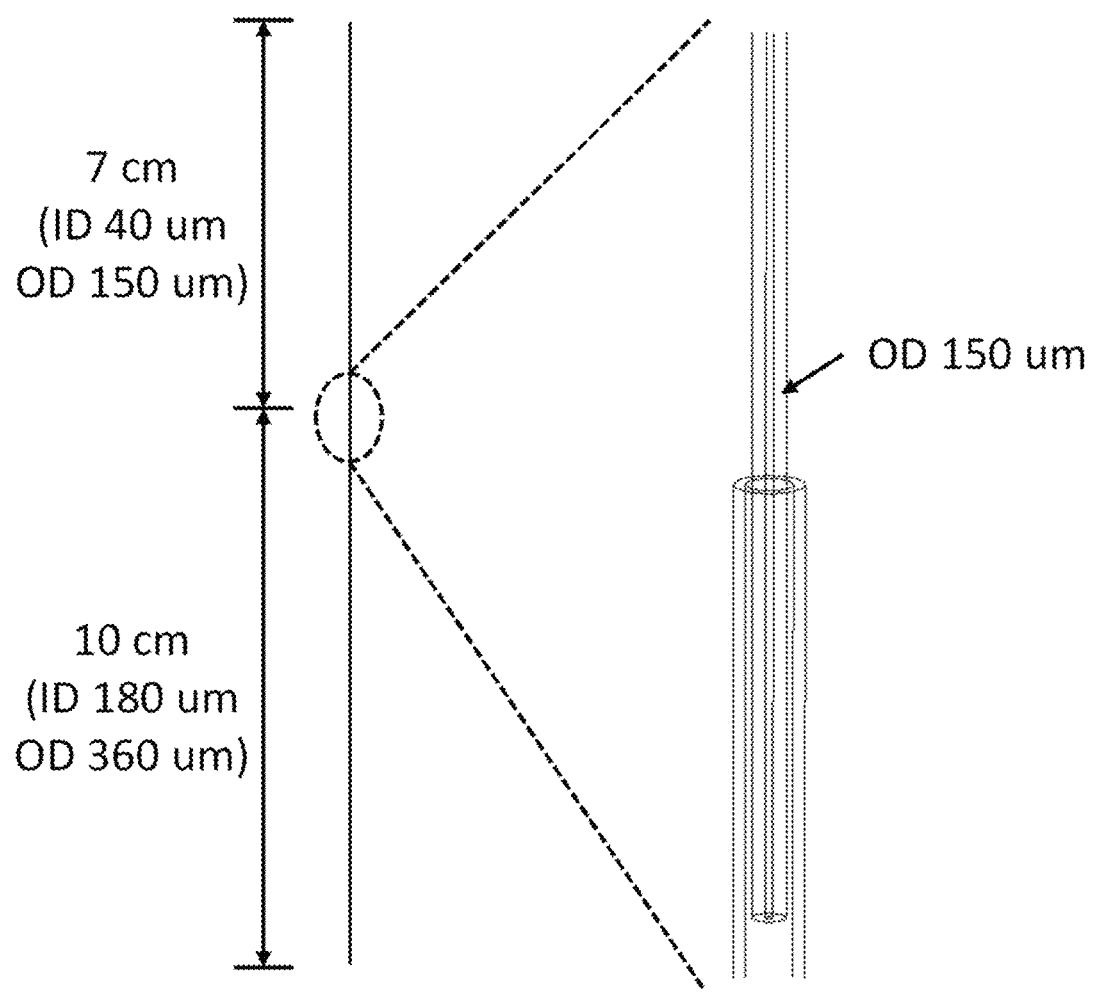
FIG. 2A is an illustration of a first capillary and a second capillary forming a sheath structure, according to an embodiment.
Figure 2B:
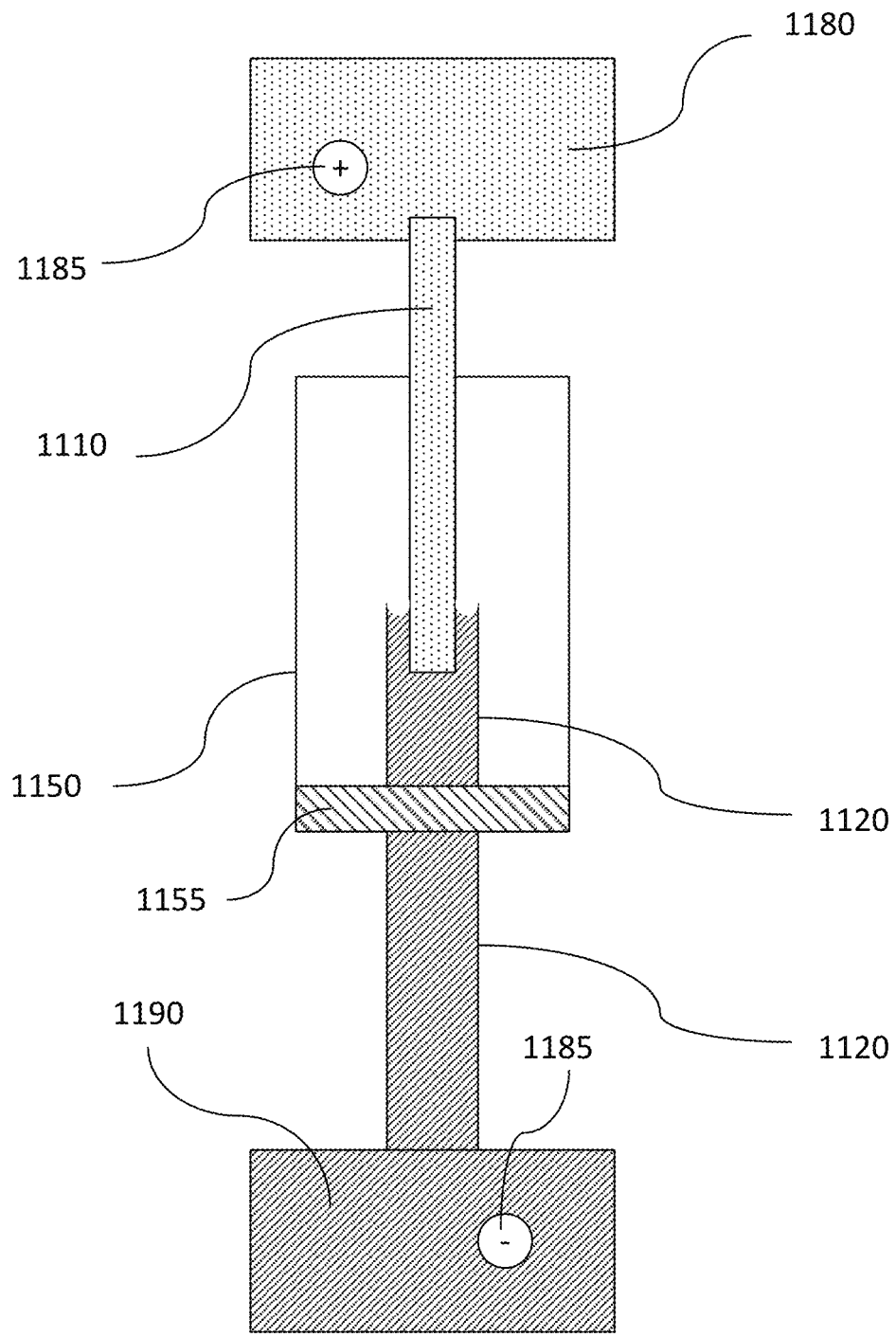
FIG. 2B is a schematic representation of a capillary cartridge including a T-junction sheath channel construction, according to an embodiment.

FIG. 2B schematically illustrates a cartridge configured for use in capillary electrophoresis. FIGS. 3A-3D illustrate operation of the cartridge, according to an embodiment. The cartridge can include a top running buffer reservoir 1180 and the bottom of the transfer capillary 1120 can be configured to be disposed in a bottom running buffer reservoir 1190. Similarly stated, the cartridge can include a housing containing the top running buffer reservoir 1180, the separation capillary 1110, and at least partially containing the transfer capillary 1120. For example, the transfer capillary 1120 can protrude out the bottom of the cartridge housing such that the bottom of the transfer capillary 1120 can be disposed within reservoirs containing sample and/or bottom running buffer. Electrodes 1185 in contact with the top running buffer reservoir 1180 and the bottom running buffer reservoir 1190 can be used to apply an electric potential across the internal volume of the capillary assembly. The separation capillary 1110 can be filled with sieving matrix for the electrophoretic separation of analytes (e.g., proteins).

The separation capillary 1110 can have an ID in a range from 10 to 50 µm and an OD in a range from 100 to 360 µm. The transfer capillary 1120 can have an ID in a range from 150 to 450 µm. In a typical construction, the separation capillary 1110 has an ID of 30-40 µm and OD of 150 µm, while the transfer capillary 1120 has an ID of 180 µm. For such a construction, the electric field is concentrated in the small capillary with a field ratio of more than 10 to 1 between the transfer capillary 1120 and the separation capillary 1110. Therefore, during the sample electrokinetic (EK) injection, and the subsequent electrophoretic separation, the voltage drop in the larger transfer capillary 1120 capillary is minimal. The high ID ratio (180):40 in this case) also minimizes sample loss from the separation capillary 1110 while loading running buffer into the transfer capillary 1120. The hydrodynamic resistance of the separation capillary 1110 can be more than 30,000 times higher than the transfer capillary because of the high ID ratio, which can be further enhanced by the high viscosity of the sieving matrix in the separation capillary 1110 (e.g., 80 times higher than that of running buffer or sample). Although illustrated schematically with constant diameters, in some embodiments, the transfer capillary 1120 can have a tapered profile. For example, the ID of the transfer capillary 1120 can be larger where the separation capillary 1110 is inserted, than where the transfer capillary 1120 is disposed in sample reservoir/run buffer reservoir 1190.

The cartridge can be positioned such that a bottom end of the transfer capillary 1120 is disposed in a sample plate or sample reservoir 1185. Sample can be loaded into the transfer capillary 1120 by applying a vacuum to the waste tank 1150, as shown in FIG. 3A. Loading the sample into the transfer capillary 1120 can bring it into contact with the separation capillary 1110 (e.g., at the junction of the transfer capillary 1120 and separation capillary 1110). Then, a voltage can be applied across the separation capillary 1110 and the transfer capillary 1120. In this way, the sample 1187 can be electrokinetically (EK) injected into the separation capillary 1110, as shown in FIG. 3B.

After the sample is loaded into the transfer capillary 1120 and/or injected into the separation capillary 1110, the bottom of the transfer capillary 1120 can be disposed within a run buffer reservoir 1190, as shown in FIG. 3C. For example, the cartridge can be moved from the sample reservoir 1185 to the run buffer reservoir 1190, or a plate containing the sample reservoir 1185 and the run buffer reservoir 1190 can be moved to place the bottom of the transfer capillary 1120 into the run buffer reservoir 1190. Running buffer can be loaded into the transfer capillary, displacing residual sample 1155 by applying vacuum to the waste tank 1150. As shown in FIG. 3D, voltage can again be applied between the top end of the separation capillary 1110 and bottom end of the transfer capillary 1120 to initiate the separation of injected sample, shown schematically as separated bands 1189.

In some instances, applying a vacuum to the waste tank 1150 to load running buffer into the transfer capillary 1120, as shown in FIG. 3C can result in loss of a portion of the sample plug 1187, as the vacuum applied to the waste tank 1150 tends to produce some amount of hydrodynamic flow from the top running buffer reservoir 1180 towards the transfer capillary 1120. Sample loss is reduced by controlling the hydrodynamic resistance of the separation capillary 1110, the sheath channels, and the transfer capillary 1120 such that hydrodynamic flow in the separation capillary 1110 is minimized when vacuum is applied to the waste tank 1150. Hydrodynamic resistances can be controlled through the choice of the length of the sheath channel, the diameters of the capillaries, the viscosity of the sample buffer and separation gel, and using other methods known to those skilled in the art.

In some embodiments, a constriction or filter (not shown) can be disposed at the end of the transfer capillary 1120 that interfaces with the sample reservoir 1185 or bottom running buffer reservoir 1190. Such a constriction or filter can act to prevent debris from entering the transfer capillary 1120 and subsequently becoming lodged in the narrow sheath channels. Addition of the constriction or filter may act to create more hydrodynamic flow in the separation capillary 1110 when applying a vacuum to the waste tank, to load the transfer capillary 1120 with running buffer, as shown in FIG. 3C. For example, the hydrodynamic flow in the separation capillary 1110 can be reduced by applying different pressures or vacuums at the waste tank 1150 and top running buffer reservoir 1180 when suction is applied to the waste tank 1150, such that there is minimal or no pressure drop across the separation capillary 1110. In some embodiments, a hydrophobic membrane can be disposed between the top running buffer reservoir 1190 and a vacuum source, which can inhibit the introduction of liquid (e.g., running buffer) into the vacuum source.

In some embodiments, the waste tank 1150 and/or running buffer reservoir 1180) can be connected to a single pressure or vacuum source, through, for example, isolation valves. A vacuum reservoir can be lowered to a first vacuum by opening a first isolation valve to the top running buffer reservoir 1180. Then the first isolation valve to the top running buffer reservoir 1180 can be closed and the vacuum in the single controlled vacuum reservoir can be changed to a second vacuum different than the first vacuum level with a second isolation valve (if present) to the waste tank 1150 open. In this way, the top running buffer reservoir 1180 and the waste tank 1150 can be exposed to two different vacuums such that the pressure drop across the separation capillary is minimized. In yet another embodiment, the net motion of the sample plug 1187 is reduced by opening and closing one or more isolation valves connecting the top running buffer reservoir 1180 and/or waste tank 1150 to a controlled pressure or vacuum source such that the average hydrodynamic flow in the separation capillary is minimized while loading the transfer capillary with running buffer, as show in in FIG. 3C. In other words, the sample plug 1187 can be alternately pushed towards and away from the top running buffer reservoir 1180, but experiences little or no net displacement.

Separated analytes can be detected when they migrate through a detector window. For example, as shown in FIG. 3D, separated bands 1189 can migrate through the separation capillary 1110 and past a detector. In other embodiments, one or more detectors can be configured to simultaneously image multiple bands 1189. This process can be repeated to analyze additional samples. For example, after a first sample is separated, the bottom of the transfer capillary 1120 can be disposed in a second sample reservoir. For example, the cartridge containing the capillary can be moved to another well on a sample/buffer plate and/or a plate can be moved relative to the cartridge. Optionally, before the second sample is drawn into the transfer capillary 1120, the cartridge containing the capillary can be moved to a well containing a wash buffer, the wash buffer can be operable to flush the first sample from the transfer capillary 1120. A portion of the wash buffer can be collected in waste tank 1150. In some instances, before the second sample is drawn into the transfer capillary 1120 (e.g., before and/or after washing the transfer capillary 1120), the cartridge containing the capillary can be moved to a waste well and the contents of the transfer capillary can be expelled into the waste well, for example, by applying a positive pressure to the waste tank 1150.

Figure 4:
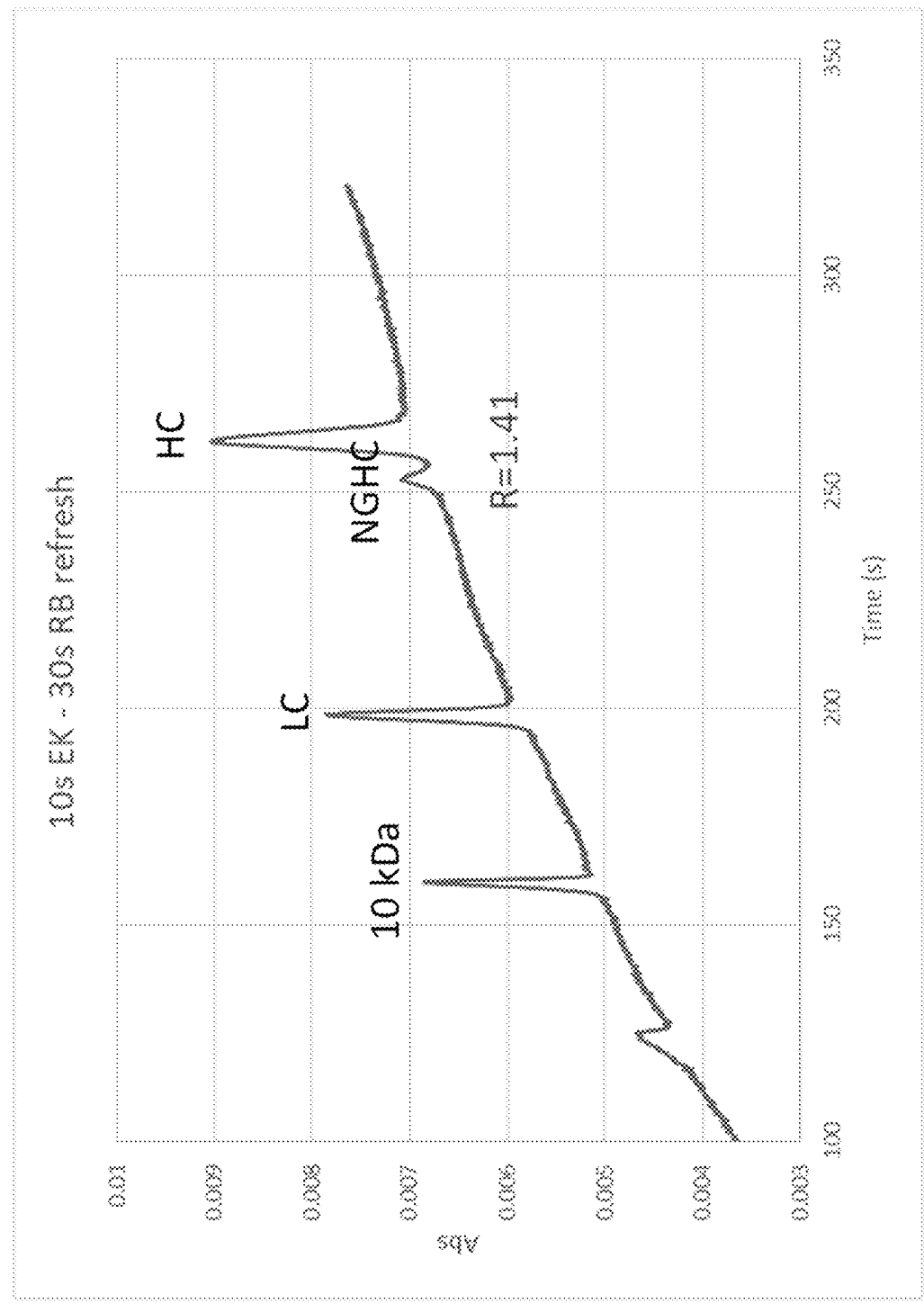
FIG. 4 is a plot showing the separation of immunoglobulin G (IgG) molecules with a capillary cartridge that includes a sheath channel, according to an embodiment.

FIG. 4 illustrates the separation of reduced IgG protein molecules analyzed using a capillary cartridge similar to that shown and described with reference to FIGS. 1A and 2A-2B in a Maurice instrument. As shown, four peaks are separated and detected in the order of 10 kD standard, light chain (LC), non-glycosylated heavy chain (NGHC), and heavy chain (HC). The separation of NGHC and HC is usually employed to assess the separation resolution of the Maurice system. In this case, the separation resolution is about 1.4 which is calculated between peak centers (in time or distance) divided by the average width of the two peaks in question (in time or distance), indicating close to baseline separation between these two peaks. The migration time of the last peak (HC) is less than 5 min, indicating about 5 times faster separation than a standard cartridge run (e.g., a cartridge containing a separation capillary having a length approximately equal to the combined length of the separation capillary and the transfer capillary shown in FIGS. 1A and 2A-2B) on a Maurice instrument.

Figure 5:
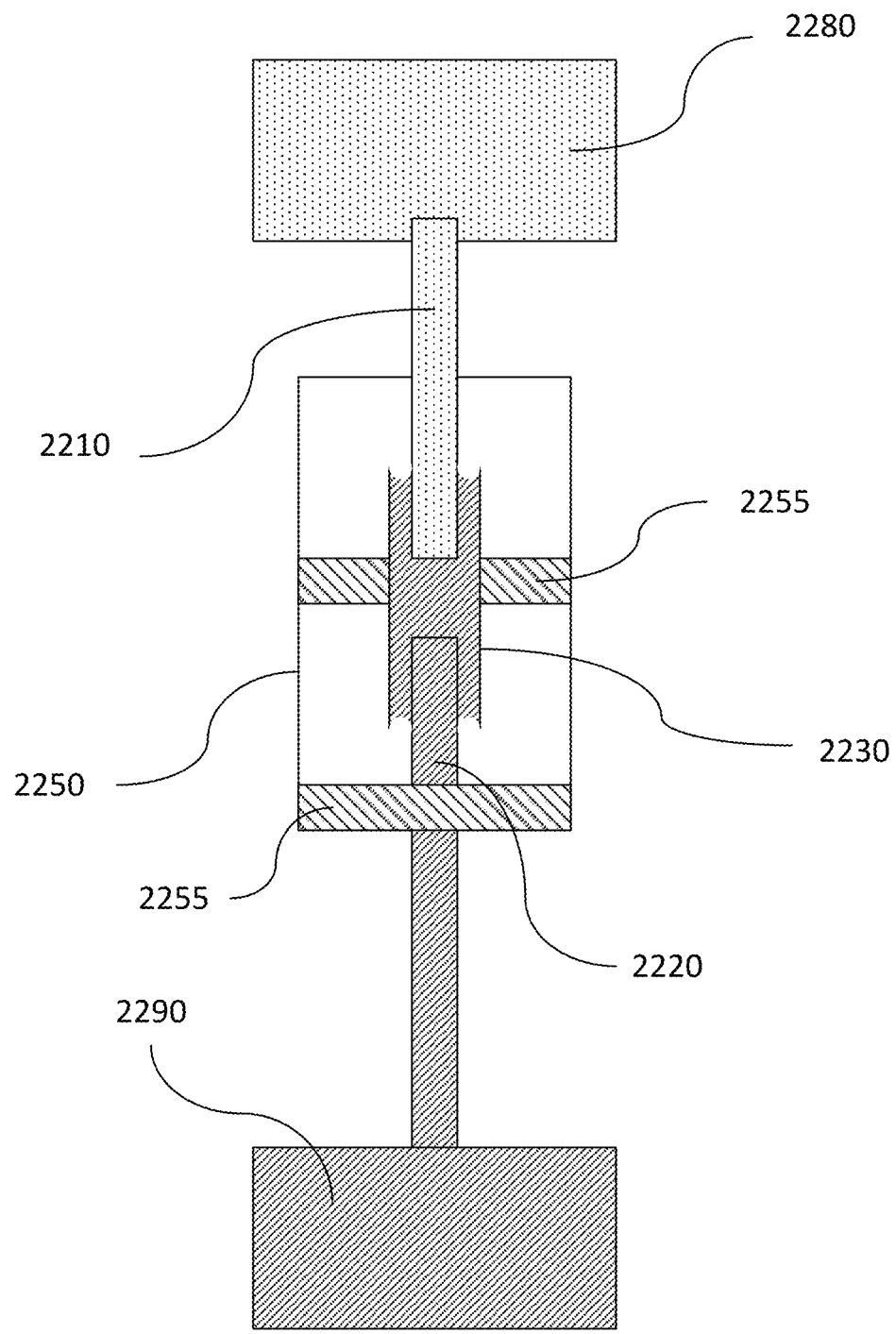
FIG. 5 is a schematic illustration of a capillary cartridge including a cross-junction sheath channel construction, according to an embodiment.

The cross-junction sheath channel as described in FIG. 1B can be used to construct a capillary cartridge for high throughput capillary electrophoresis, for example, as shown in FIG. 5. The advantage of using cross-junction sheath channels relative to a T-junction sheath channel is that cross-junction sheath channel cartridges can further reduce sample and reagent consumption through the use of a small ID transfer capillary. However, cartridges containing cross-junction capillary configurations may increase the complexity of cartridge construction.

The embodiment of FIG. 5 is otherwise similar in structure and operation to the embodiment shown and described above with reference to FIGS. 2B and 3A-3D. Namely, a cartridge can include a transfer capillary 2220 configured to be disposed in a sample reservoir and/or bottom running buffer reservoir 2290. The transfer capillary 2220 can be coupled to a separation capillary 2210 via an intermediate capillary 2230. By controlling a vacuum of a waste tank 2250, sample can be loaded from a sample reservoir and brought into contact with the separation capillary 2210. A sample plug can be electrokinetically injected into the separation capillary 2110 and the sample can be separated by applying a voltage across a top running buffer reservoir 2280 and the bottom running buffer reservoir 2290.

As discussed above with reference to FIG. 1B, the Separation capillary 2210 and the transfer capillary 2220 can have the same or different IDs and/or ODs. In some instances it may be preferable for the transfer capillary 2220 to have a larger ID than an ID of the separation capillary 2210. Such an embodiment can allow for faster loading through the larger ID of the transfer capillary 1120 (relative to the separation capillary 2210), while keeping the ID of the transfer capillary 2210 smaller than the OD of the separation capillary 2210, which can reduce reagent consumption, reduce waste, for example, when washing the transfer capillary 2210 between sample runs, and/or improve efficiency of washing out a sample due to reduced Taylor-Aris dispersion.

According to an embodiment, the separation capillary 2210 can have a length of 75.5 mm, a 40 μm ID, and a 363 μm OD: the intermediate capillary 2230 can have a length of 20.5 mm, a 400 μm OD, and a 665 μm OD: and the transfer capillary 2220) can have a length of 90.4 mm, a 150 μm ID, and a 363 μm OD. The separation capillary 2210 can overlap with the intermediate capillary 2230 by 15 mm. The transfer capillary 2220 can overlap with the intermediate capillary 2230 by 5 mm. It should be understood, however, that any suitable combination of lengths. IDs. ODs. and/or overlaps is possible. For example, the separation capillary 2110 and the transfer capillary 2230 can each have an ID in a range from 10 to 50 μm and an OD in a range from 100 to 360 μm (and not necessarily the same ID and/or OD): the intermediate capillary 2230 can have an ID in a range from 150 to 450 μm. A skilled artisan would understand that the throughput and separation resolution characteristics of a cartridge can be influenced by varying the lengths of the separation capillary 2210 and the transfer capillary 2220. Therefore, for a given overall length of the transfer capillary 2220, intermediate capillary 2230, separation capillary 2210 assembly throughput can be increased by increasing the length of the transfer capillary 2220 (and/or increasing the ID of the transfer capillary 2220) and resolution can be increased by lengthening the separation capillary 2210 (and/or decreasing the ID of the separation capillary). As shown in FIG. 2A, a suitable overall capillary length for the Maurice instrument is 170 mm, although other instruments may have different suitable overall capillary lengths. Typically the intermediate capillary 2230) is significantly shorter than the separation capillary 2210 and the transfer capillary 2220, but it should be understood that any suitable relative and/or absolute lengths can be selected.

Although FIG. 5 (and FIG. 1B) illustrates two sheath channels, one at the junction of the transfer capillary 2220 and intermediate capillary 2230) and another at the junction of the separation capillary 2210) and intermediate capillary 2230, in some embodiments, the intermediate capillary 2230 can be glued (or otherwise sealed) to the transfer capillary 2220. In such an embodiment, a three-capillary construction forms a T-junction (similar to the embodiment of FIGS. 1A and 2B), by sealing the sheath channel between the intermediate capillary 2230 to the transfer capillary 2220, while leaving the sheath channel between the intermediate capillary 2230 and the separation capillary 2210 open. Such an embodiment can simplify construction of the assembly, while allowing the ID of the transfer capillary 2220 to be smaller than the OD of the separation capillary 2210. In an alternative embodiment, the sheath channel between the separation capillary 2210 and the intermediate capillary 2230) can be sealed, while leaving the sheath channel between the transfer capillary 2220 and the intermediate capillary 2230) open.

Figure 6B:
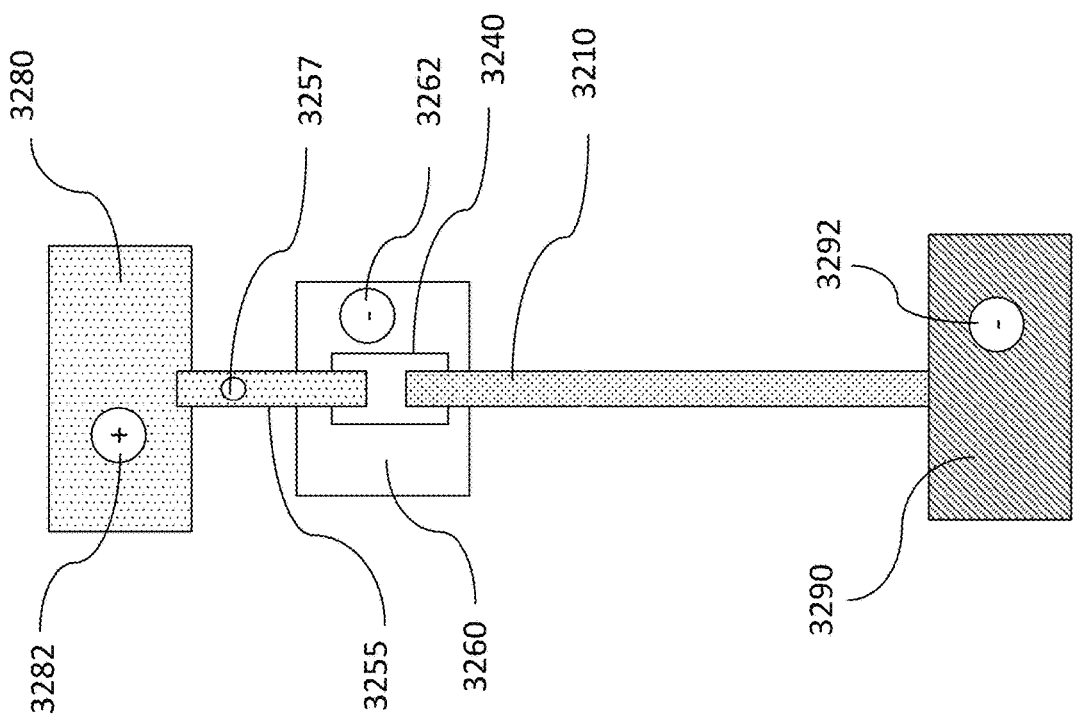
FIGS. 6A and 6B are a schematic illustration of embodiments of a capillary cartridge including a destaining gel.

FIG. 6B is a schematic illustration of a capillary cartridge that include a destaining gel 3260, according to an embodiment. The destaining gel 3260 can be used in conjunction with techniques for inline protein staining/labeling with post-separation dilution/destaining as described, for example, in U.S. Pat. Nos. 6,475,364, 7,169,277, and/or Luc Bousse et al., Protein Sizing on a Microchip, 73 Anal. Chem 1207-1212 (2001), the entire disclosure of each of which is hereby incorporated by reference. As shown in FIG. 6B, the separation capillary 3210 can include a fluorescent dye configured to bind to SDS-coated (sodium dodecyl sulfate-coated) proteins and free SDS micelles. A destaining gel can be disposed before a detection window 3257, and configured to increase specificity by reducing background fluorescence. Specifically, because the fluorescent dye binds to free SDS micelles, samples separated in a capillary including a fluorescent dye will have high levels of background fluorescence. Initially the destaining gel 3260 may not contain SDS or dye and can be configured to dilute free SDS concentration below the critical micelle concentration (CMC), which will cause SDS micelles to break and release the fluorescent dye, substantially decreasing background fluorescence. The sample can be exposed to the destaining gel 3260 after the separation capillary 3210, such that analytes encounter it after having been separated.

As shown in FIG. 6B, an end of the separation capillary 3210 can be disposed within a first end portion of a larger (intermediate) capillary 3240. An end of the detection capillary 3255 can be disposed within a second end portion of the intermediate capillary 3240. In this way, the separation capillary 3210), intermediate capillary 3240, and detection capillary 3255 can form a cross-junction in a manner similar to that described with reference to FIG. 1B. The destaining gel can be disposed in the intermediate capillary 3240 and/or in a reservoir 3260 at a junction of the separation capillary 3210 and the transfer capillary 3240. The voltage between the primary cathode 3292 and the anode 3282 can cause negatively charged ions (e.g., SDS-protein complexes and/or SDS micelles) in the sample to separate and continuously move towards the anode 3282 and the top running buffer reservoir 3280. In some instances, a secondary cathode 3262 can be coupled to the reservoir 3260 containing destaining gel, such that the voltages across the separation capillary 3210 and the detection capillary 3255 can be separately controlled. Additionally, when components of the separated sample reach the destaining-gel containing intermediate capillary 3240, the electric filed induced by the secondary cathode 3262 can cause the sample to be "pinched" by a region with no or reduced SDS, decreasing background fluorescence. The effect of the pinch is axisymmetric, causing the destaining effect to be highly efficient as compared to, for example, a planar destaining process.

The detection capillary 3255 can include a detection window 3257 or be disposed behind a detection window of the cartridge housing (not shown). The separated analytes can be detected through any suitable means as they pass through the detection capillary/detection window. For example, the fluorescent dye can be excited by an illumination source (e.g., an LED, laser, etc.) and the resulting emissions can be detected (e.g., using a camera, CCD, etc.).

Figure 6A:
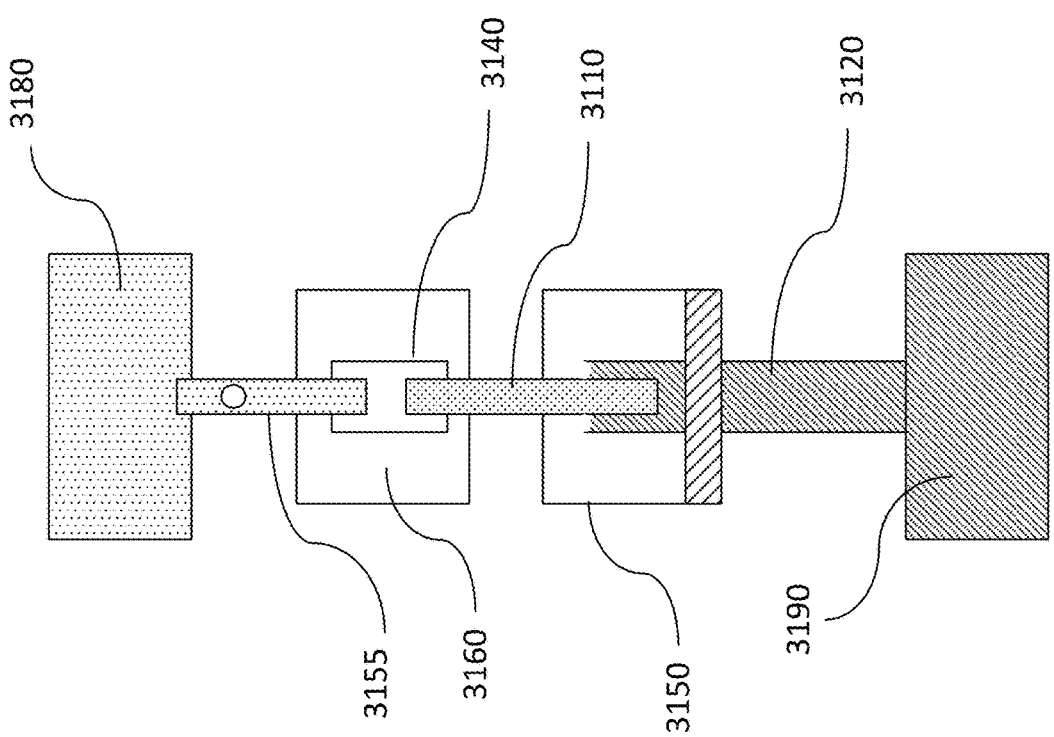

FIG. 6A is a schematic illustration of an embodiment of a capillary cartridge including a destaining gel similar to FIG. 6B. FIG. 6A further depicts a transfer (or secondary) capillary 3120 similar to that shown and described with reference to FIGS. 1A and 2A-3D. As discussed above, the sample can be aspirated through the transfer capillary 3210 via suction applied to the waste tank 3150 and through a sheath channel such that the sample is brought into contact with the separation (or primary) capillary 3110. The transfer capillary 3120 and/or the separation capillary 3110 can contain SDS and fluorescent dye (e.g., drawn with the sample from the bottom running buffer 3190) configured to bind to SDS-coated proteins and/or free proteins.

As described above with reference to FIG. 6B, a destaining gel can reduce free SDS concentration, reducing background fluorescence before separated analytes pass through a detection window. Accordingly, the cartridge can include an intermediate capillary 3140 within a reservoir 3160 containing destaining gel. The sample can pass through the destaining gel in the intermediate capillary 3140 and into a detection capillary 3155, which is coupled to a top running buffer reservoir 3180. As discussed with reference to FIG. 6B, a secondary cathode coupled to the destaining reservoir 3260 can be used to allow voltages across the detection capillary 3155 and the separation capillary 3110/transfer capillary 3120 to be controlled separately.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of the embodiments as discussed above. For example, it should be understood that for embodiments described as containing two capillaries forming a T-junction (e.g., as shown in FIGS. 1A and 6A (at the junction of transfer capillary 3120 and separation capillary 3110)) it is possible instead to include an intermediate capillary that form a cross-junction (e.g., as shown in FIG. 1B) or a t-junction, for example by sealing one of the junction between the intermediate capillary and a separation capillary or the junction between the intermediate capillary and a transfer capillary. Similarly, it should be understood that for embodiments described as containing three capillaries it is possible to instead include two capillaries forming a T-junction (e.g., as shown in FIG. 1A).

Where methods and/or events described above indicate certain events and/or procedures occurring in a certain order, the ordering of certain events and/or procedures may be modified. Additionally, certain events and/or procedures may be performed concurrently in a parallel process when possible, as well as performed sequentially as described above.

As used herein, the term "sample" refers to a composition that contains an analyte or analytes to be detected or separated. A sample can be heterogeneous, containing a variety of components (e.g., different proteins) or homogenous, containing one component. In some instances, a sample can be naturally occurring, a biological material, and/or a man-made material. Furthermore, a sample can be in a native or denatured form. In some instances, a sample can be a single cell (or contents of a single cell) or multiple cells (or contents of multiple cells), a blood sample, a tissue sample, a skin sample, a urine sample, a water sample, and/or a soil sample. In some instances, a sample can be from a living organism, such as a eukaryote, prokaryote, mammal, human, yeast, and/or bacterium or the sample can be from a virus. In some instances, a sample can be one or more stem cells (e.g., any cell that can divide for indefinite periods of time and to give rise to specialized cells). Suitable examples of stem cells can include but are not limited to embryonic stem cells (e.g., human embryonic stem cells (hES)), and non-embryonic stems cells (e.g., mesenchymal, hematopoietic, induced pluripotent stem cells (iPS cells), or adult stem cells (MSC)).

As used herein, the term "analyte" refers to any molecule or compound to be detected or separated, as described herein. Suitable analytes can include but are not limited to, small chemical molecules such as, for example, environmental molecules, clinical molecules, chemicals, pollutants, and/or biomolecules. More specifically, such chemical molecules can include but are not limited to pesticides, insecticides, toxins, therapeutic and/or abused drugs, hormones, antibiotics, antibodies, organic materials, proteins (e.g., enzymes, immunoglobulins, and/or glycoproteins), nucleic acids (e.g., DNA and/or RNA), lipids, lectins, carbohydrates, whole cells (e.g., prokaryotic cells such as pathogenic bacteria and/or eukaryotic cells such as mammalian tumor cells), viruses, spores, polysaccharides, glycoproteins, metabolites, cofactors, nucleotides, polynucleotides, transition state analogs, inhibitors, nutrients, electrolytes, growth factors and other biomolecules and/or non-biomolecules, as well as fragments and combinations thereof. Some analytes described herein can be proteins such as enzymes, drugs, cells, antibodies, antigens, cellular membrane antigens, and/or receptors or their ligands (e.g., neural receptors or their ligands, hormonal receptors or their ligands, nutrient receptors or their ligands, and/or cell surface receptors or their ligands).

As used herein, the term "protein" refers to proteins, oligopeptides, peptides, and analogs, including proteins containing non-naturally occurring amino acids and amino acid analogs, and peptidomimetic structures. The term "protein" also refers to proteins, oligopeptides, peptides, and analogs that have various isoelectric points.

Where dimensions (e.g., length, width, diameter, volume, etc.) are specified, it should be understood that such dimensions are approximate and may vary by +/−10% while still falling within the scope of the specifically enumerated dimension(s). Furthermore, unless explicitly stated otherwise, where dimensions or other numerical values are specified, it should be understood that such values are exemplary only and the other dimensions, sizes, or configurations are possible without departing from the scope of the present disclosure. For example, some embodiments describe relative and/or absolute lengths and diameters of capillaries. A person skilled in the art would understand that capillaries of different sizes than those explicitly enumerated could be selected without departing from the scope of the present disclosure.

What is claimed is:

1. A cartridge, comprising:
a first capillary configured for analyte separation during capillary electrophoresis;
a second capillary configured to introduce reagents and analytes into the first capillary;
a third capillary disposed between the first capillary and the second capillary, an inner diameter of the third capillary larger than an outer diameter of the first capillary and an outer diameter of the second capillary; and
a waste tank disposed at at least one of a junction between the first capillary and the third capillary or a junction of the second capillary and the third capillary,
the waste tank configured such that a vacuum can be applied to the second capillary via the waste tank to draw a sample from a sample reservoir and through the second capillary and the third capillary and into contact with the first capillary.

2. The cartridge of claim 1, wherein one of the junction of the first capillary and the third capillary or the junction of the second capillary and the third capillary is sealed.

3. The cartridge of claim 1, wherein an inner diameter of the second capillary is larger than an inner diameter of the first capillary.

4. The cartridge of claim 1, wherein:
a first end of the first capillary is disposed within a second end of the third capillary; and
a second end of the second capillary is disposed within a first end of the third capillary.

5. The cartridge of claim 1, further comprising a first buffer reservoir, a second end of the first capillary disposed in the first buffer reservoir, a first end of the second capillary configured to be disposed in a second buffer reservoir.

6. The cartridge of claim 1, further comprising:
a first buffer reservoir, a second end of the first capillary disposed in the first buffer reservoir,
a first end of the second capillary configured to be disposed in a second buffer reservoir; and
an electrode in electrical contact with the first buffer reservoir, the electrode configured to apply an electric potential across the first capillary and the second capillary via the first buffer reservoir and the second buffer reservoir.

7. The cartridge of claim 1, further comprising a valve coupled to the waste tank or a buffer reservoir.

8. A cartridge, comprising:
a first capillary configured for analyte separation during capillary electrophoresis;
a second capillary configured to introduce reagents and analytes into the first capillary;
a third capillary disposed between the first capillary and the second capillary, an inner diameter of the third capillary larger than an outer diameter of the first capillary and an outer diameter of the second capillary; and
a waste tank disposed at at least one of a junction between the first capillary and the third capillary or a junction of the second capillary and the third capillary,
the waste tank configured to contain an excess of a sample when a vacuum is applied to the second capillary via the waste tank to draw the sample from a sample reservoir and through the second capillary.

9. The cartridge of claim 8, wherein one of the junction of the first capillary and the third capillary or the junction of the second capillary and the third capillary is sealed.

10. The cartridge of claim 8, wherein an inner diameter of the second capillary is larger than an inner diameter of the first capillary.

11. The cartridge of claim 8, wherein:
a first end of the first capillary is disposed within a second end of the third capillary; and
a second end of the second capillary is disposed within a first end of the third capillary.

12. The cartridge of claim 8, further comprising a first buffer reservoir, a second end of the first capillary disposed in the first buffer reservoir, a first end of the second capillary configured to be disposed in a second buffer reservoir.

13. The cartridge of claim 8, further comprising:
a first buffer reservoir, a second end of the first capillary disposed in the first buffer reservoir,
a first end of the second capillary configured to be disposed in a second buffer reservoir; and
an electrode in electrical contact with the first buffer reservoir, the electrode configured to apply an electric potential across the first capillary and the second capillary via the first buffer reservoir and the second buffer reservoir.

14. The cartridge of claim 8, further comprising a valve coupled to the waste tank or a buffer reservoir.

15. A method, comprising:
applying vacuum to a second capillary via at least one of a junction of the second capillary and a third capillary or a junction of a first capillary and the third capillary while a first end of the second capillary is disposed in a sample reservoir, such that a sample is drawn from the sample reservoir into the second capillary,
a first end of the first capillary inserted into a second end of the third capillary and a second end of the second capillary inserted into a first end of the third capillary such that the first end of the first capillary is in contact with the sample when the second capillary and the third capillary are filled with the sample, the first capillary configured for analyte separation during electrophoresis;
disposing the first end of the second capillary into a run buffer reservoir after drawing the sample from the sample reservoir;
applying vacuum to at least one of the junction of the second capillary and the third capillary or the junction of the first capillary and the third capillary while the first end of the second capillary is disposed in the run buffer reservoir such that a run buffer is drawn from the run buffer reservoir into the second capillary and the third capillary; and
electrophoretically separating the sample in the first capillary.

16. The method of claim 15, further comprising electrokinetically injecting sample into the first capillary when the second capillary is filled with the sample.

17. The method of claim 15, further comprising applying a voltage to the first capillary when the second capillary is filled with the sample such that sample migrates into the first capillary.

18. The method of claim 15, further comprising moving a tray containing the sample reservoir and the buffer reservoir after the sample is drawn from the sample reservoir into the second capillary to dispose the first end of the second capillary in the buffer reservoir.

* * * * *